US011297544B2

(12) United States Patent
Rath

(10) Patent No.: US 11,297,544 B2
(45) Date of Patent: Apr. 5, 2022

(54) DOMAIN REQUEST

(71) Applicant: T-Mobile USA, Inc., Bellevue, WA (US)

(72) Inventor: Asit Kumar Rath, Redmond, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 77 days.

(21) Appl. No.: 16/941,084

(22) Filed: Jul. 28, 2020

(65) Prior Publication Data

US 2022/0038961 A1 Feb. 3, 2022

(51) Int. Cl.
*H04W 36/14* (2009.01)
*H04W 36/00* (2009.01)
*H04W 88/06* (2009.01)
*H04W 48/18* (2009.01)
*H04W 60/02* (2009.01)

(52) U.S. Cl.
CPC ....... *H04W 36/0022* (2013.01); *H04W 36/14* (2013.01); *H04W 48/18* (2013.01); *H04W 60/02* (2013.01); *H04W 88/06* (2013.01)

(58) Field of Classification Search
CPC . H04W 36/0022; H04W 36/14; H04W 48/18; H04W 60/02; H04W 88/06
See application file for complete search history.

(56) References Cited

U.S. PATENT DOCUMENTS

| 6,937,862 | B2* | 8/2005 | Back | H04W 8/04 455/445 |
| 8,078,166 | B2* | 12/2011 | Thiebaut | H04L 65/1043 455/433 |
| 8,170,564 | B2* | 5/2012 | Sugiura | H04M 3/42246 455/442 |
| 8,929,330 | B2* | 1/2015 | Taniuchi | H04L 63/0272 370/331 |
| 9,420,526 | B2* | 8/2016 | Zisimopoulos | H04W 48/18 |
| 9,706,340 | B2 | 7/2017 | Kim et al. | |
| 2006/0187858 | A1* | 8/2006 | Kenichi | H04W 48/16 370/254 |
| 2018/0092152 | A1* | 3/2018 | Rodbro | H04L 41/0668 |
| 2019/0149413 | A1 | 5/2019 | Kim et al. | |

\* cited by examiner

*Primary Examiner* — Julio R Perez
(74) *Attorney, Agent, or Firm* — Lane Powell PC

(57) ABSTRACT

A system and method for determining registration to a packet-switching (PS) domain or a circuit-switching (CS) domain via a single request is discussed herein. A single request includes a query hierarchy to query a node of a first domain and then, if the UE is not registered with the first domain, to query a node of a second domain. The request includes an attribute value pair (AVP) to determine which domain to query first and which node of the first domain to query. The domains of the AVP are acquired from a list to permit multiple domains to be queried with the single request.

20 Claims, 3 Drawing Sheets

DOMAIN REQUEST

BACKGROUND

An application server of a telecommunications network can query a domain, whether packet-switched or circuit-switched, to determine the domain to which a user equipment is registered. By establishing the registered domain, the application server can determine the services available to the user equipment. For example, the packet-switched domain provides for data or voice services, whereas the circuit-switched domain provides for voice or legacy messages.

The application server generates and transmits a query to a node of a first domain. When a response from the node is negative (i.e., user equipment is not registered with the first domain), the application server can either generate and transmit another query to a node of a second domain or conclude that the user equipment is registered with the second domain. Generating and transmitting another query or concluding registration to the second domain can increase latency or inhibit the availability of certain services, thereby reducing the user or customer experience. Generating and transmitting another query can also increase wasted signaling for the service provider.

What is needed is a telecommunications network having an improved domain request. What is further needed is a telecommunication network to more efficiently request domain registration.

DETAILED DESCRIPTION

A system and method for determining registration of a UE to a packet-switching (PS) domain or a circuit-switching (CS) domain via a single request is disclosed herein. A telecommunications network includes two domains: a packet-switched domain and a circuit-switched domain. A user equipment (UE) can be unregistered to either domain (i.e., the UE is powered off, detached from the telecommunications network, or the like), registered to one domain, or registered to both domains. An application server, which is a component of the telecommunications network, provides services to the UE. The application server can determine the services available to the user equipment based on the domain to which the UE is registered. For example, the packet-switched domain provides for data or voice services, whereas the circuit-switched domain provides for voice or legacy messages.

An application server (AS) generates a single request and queries a node to determine a domain with which the user equipment (UE) is registered (i.e., to determine which services are available to the UE) The node being queried can respond that the UE is registered with or not registered with the domain associated with the node.

The request includes a query hierarchy to query a node of a first domain and then, if the UE is not registered with the first domain, to query a node of a second domain. The request further prevents a conclusion that a negative response to a query inherently means that the UE is connected to another domain. The request includes an attribute value pair (AVP) to determine which domain to query first and which node of the first domain to query. The domains of the AVP are acquired from a list to permit multiple domains to be queried with the single request. The AVP is a container of data that carries and includes information (e.g., authentication, authorization, accounting, routing, security, capability, the like, and combinations or multiples thereof) between nodes.

The system generates a request including a query hierarchy including an order in which to query a first domain and a second domain. The request also includes an instruction to query a first node and, if a negative response is received, to query a second node, such that the first and second nodes are associated with different domains. The system can then determine the domain to which a user equipment (UE) is registered based on the response from the first node based on a first query, the second node based on a second query, or both. A notification can then be generated which includes the domain with which the UE is registered. Services can then be executed or provided based on the domain to which the UE is registered.

By establishing the registered domain, the application server can determine the services available to the user equipment. For example, the packet-switched domain provides for data or voice services, whereas the circuit-switched domain provides for voice or legacy messages.

Figure 1:
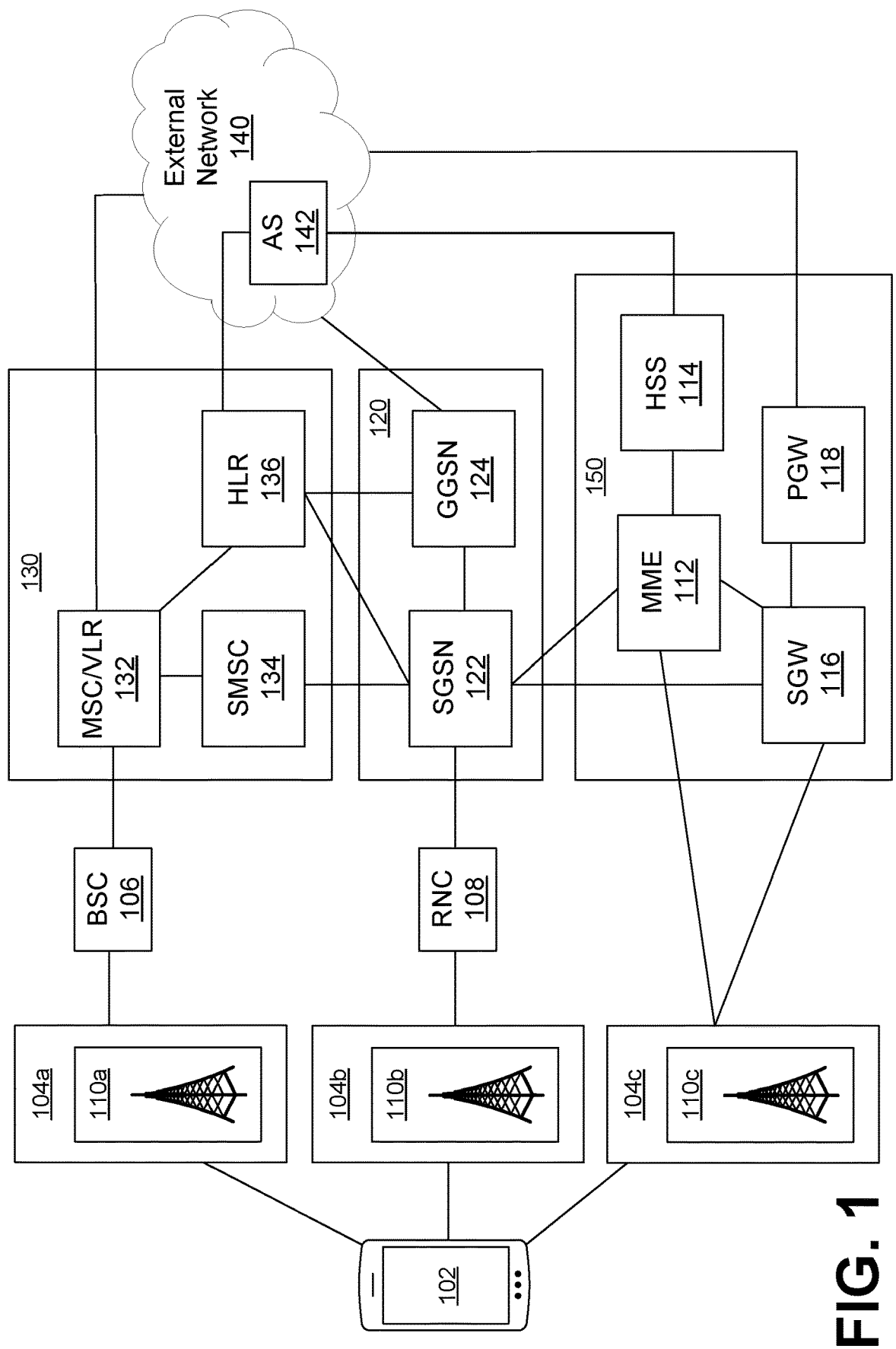
FIG. 1 illustrates an example network.

FIG. 1 shows a system including a telecommunications network 100. The telecommunications network 100 includes an access network (e.g., GERAN; UTRAN; E-UTRAN; VoLTE; 5G NR; VoNR) 104a-c which includes a network site (e.g., BTS, NodeB, eNodeB, or gNB) 110a-110c. The access network 104a-c connects a user equipment (UE) 102 to a mobile communication technology (e.g., 1G to 5G). The UE 102 can be connected to one or more access networks 104a-c simultaneously.

The UE 102 is any device used by an end-user for communication or data transmission purposes, including, without limitation, a mobile phone, a smartphone, a tablet, a personal digital assistant, a laptop with mobile connectivity, or the like.

When the access network 104c is E-UTRAN, the network site 110c is an eNodeB. The access network 104c transmits data, including data packets, between the UE 102 and an external network 140, such as through a data core 150. The network site 110c controls the UE 102 within a given cell of the telecommunications network. For example, the network site 110c sends and receives radio transmission(s) to the UE 102 using analogue and digital signal processing functions of an access network air interface. The network site 110c also controls low-level operations of the UE 102 via signaling messages, such as handover commands.

The network site 110c includes a UE communication module programmed to communicate with the UE 102 (i.e., transmit a signal or data). The UE communication module can be an interface, such as a UU or e-Uu interface. The network site 110c also includes a data core communication module programmed to communicate (i.e., transmit a signal or data) with the data core 150. The data core communication module can be an interface, such as a S1, GTP, or NG interface.

The data core 150 is an IP-based core network infrastructure that provides packet data services, such as to support the convergence of licensed and unlicensed radio technologies (e.g., an evolved packet core (EPC) or 5G Core). The data core 150 can be defined around various paradigms, including mobility, policy management, and security. The four elements of the data core include a home subscriber server (HSS) 114, a mobility management entity (MME) 112, a serving gateway (SGW) 116, and a packet data network gateway (PGW) 118.

The MME 112 pages and authenticates the UE 102. The MME 112 can retain location information at the tracker level for each UE 102 and selects the appropriate gateway during the initial registration process. The MME 112 can connect to the network site via a S1-MME interface and to the SGW 116 via a S11 interface.

The SGW 116 forwards and routes packets (e.g., data packets) to and from the network site and the PGW 118. The SGW 116 connects to the network site via a S1-U and to the PGW 118 via a S5/S8 interface.

The PGW 118 provides connectivity between the UE 102 and the external network 140, including a public data network, an IP multimedia subsystem (IMS) core, the like, or combinations or multiples thereof. The PGW 118 can be connected to the external network 140 via a SGi interface.

The HSS 114 of the data core 150, which is in communication with the MME 112 via a S6 interface, is a database that contains user-related information and subscriber-related information. Though the HSS 114 is discussed as being a node of the data core 150, the HSS 114 can be a node of the external network 140 or a first HSS can be a node of the data core 150 and a second HSS can be a node of the external network 140.

The external network 140 can include an application server (AS) 142. The AS 142 is a node that executes services (e.g., call forwarding) and fetches customer data (e.g., customer status, location information, or the like). The AS 142 can communicate with the HSS 114 and the HLR 136 via a Sh interface or MAP interface.

When the access network 104a is GERAN, the network site 110a is a base transceiver station (BTS) which is controlled by a base station controller (BSC) 106. The BTS includes equipment to transmit and receive radio signals, antennas, and equipment to encrypt and decrypt communications with the BSC 106. The BSC 106 can control multiple BTSs. The BSC 106 controls BTS handover, radio channel allocation, and UE measurements. The BTS and the BSC 106 are in communication via an Abis interface.

The BSC 106 communicates with a mobile switching center/visitor location register (MSC/VLR) 132 of a circuit-switched (CS) domain 130 via an A interface. The MSC/VLR 132 routes voice calls, text messages (i.e., short message service), and other services (e.g., conference calls, fax, CS data, or the like) and provides customer information when the customer is outside of the home network. The MSC/VLR 132 connects to an external network 140, such as a service switching point (SSP), via a CAP interface. The SSP is a telephone exchange to perform call processing. The SSP applies an SS7 protocol to control or manage call setup, call handling, and call termination with other SSPs.

The CS domain 130 also includes a home location register (HLR) 136. The HLR 136 is a database including details of each customer authorized to the CS domain 130. The MSC/VLR 132 communicates with the HLR 136 via a C, D, F, or H interface.

The CS domain 130 also includes a short message service center (SMSC) 134, which is responsible for the delivery of the short message texts. The MSC/VLR 132 communicates with the SMSC 134 via an E interface.

The BSC 106 also communicates with a serving GPRS support node (SGSN) 122 of a packet-switched (PS) domain 120 via a Gb interface. The SGSN 122 handles PS data, including mobility management and customer authentication. The SGSN 122 acts as the service access point for PS domain 120 and handles protocol conversion for internet protocol within the PS domain 120. The SGSN 122 communicates with a gateway GPRS support node (GGSN) 124 via a Gn interface. The GGSN 124 provides connectivity between the UE 102 and the external network 140, such as an external data packet network, including a public data network, an IP multimedia subsystem (IMS) core, the like, or combinations or multiples thereof. The GGSN 124 can be connected to the external network 140 via a Gi interface.

The SGSN 122 of the PS domain 120 can communicate with the SMSC 134 of the CS domain 130 via a Gd interface, with the MSC/VLR 132 of the CS domain 130 with a Gs interface, and with the HLR 136 of the CS domain 130 via a Gr or Gf interface. The GGSN 124 of the PS domain 120 can communication with the HLR 136 of the CS domain 130 via a Gc interface.

When the access network 104b is UTRAN, the network site 110b is a NodeB which is controlled by the radio network controller (RNC) 108. The NodeB includes equipment to transmit and receive radio signals, antennas, and equipment to encrypt and decrypt communications with the RNC 108. The RNC 108 can control multiple NodeBs. The RNC 108 controls radio resource management, some mobility management functions, and data encryption to and from the UE. The NodeB and the RNC 108 are in communication via an IuB interface.

The RNC 108 communicates with the SGSN 122 of the PS domain via an IuPS interface. The RNC 108 communicates with the MSC/VLR 132 of the CS domain 130 via an IuCS interface. The RNC 108 communicates with the SGW 116 of the data core 150 via a S12 interface.

Figure 2:
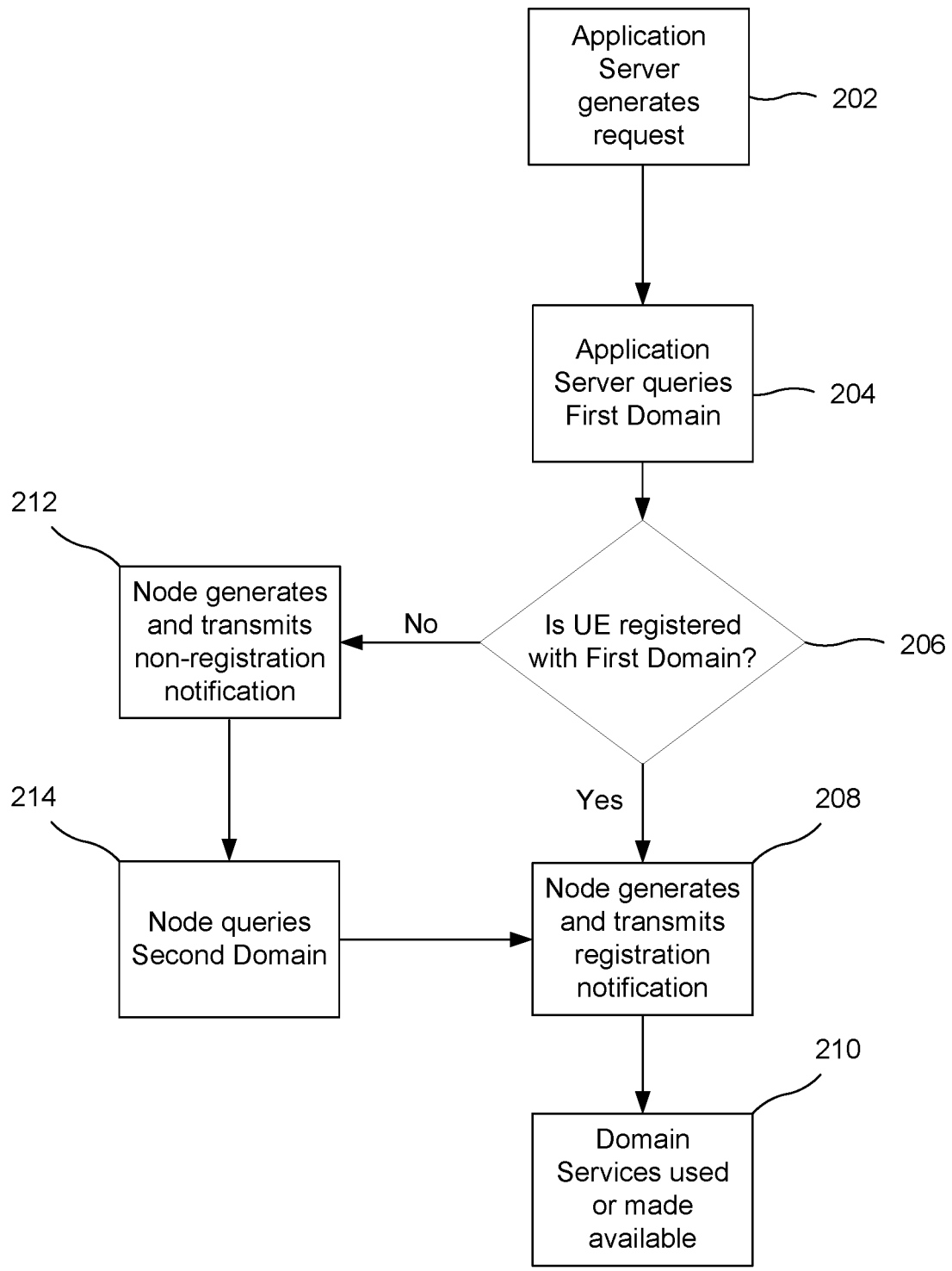
FIG. 2 illustrates a flowchart for an example process for requesting domain registration.

FIG. 2 shows a flowchart for requesting domain registration. At 202, the application server generates a user data request (UDR) causes a query to be transmitted to a node. The query, which includes a query hierarchy, can determine a domain with which the user equipment (UE) is registered (i.e., to determine which services are available to the UE). The query hierarchy sets forth the order in which to query a node of a first domain for UE registration and then, if the UE is not registered with the first domain, to query a node of a second domain for UE registration. The application server queries the domains in a given order based on the query hierarchy listed in the AVP of the UDR.

Figure 3:
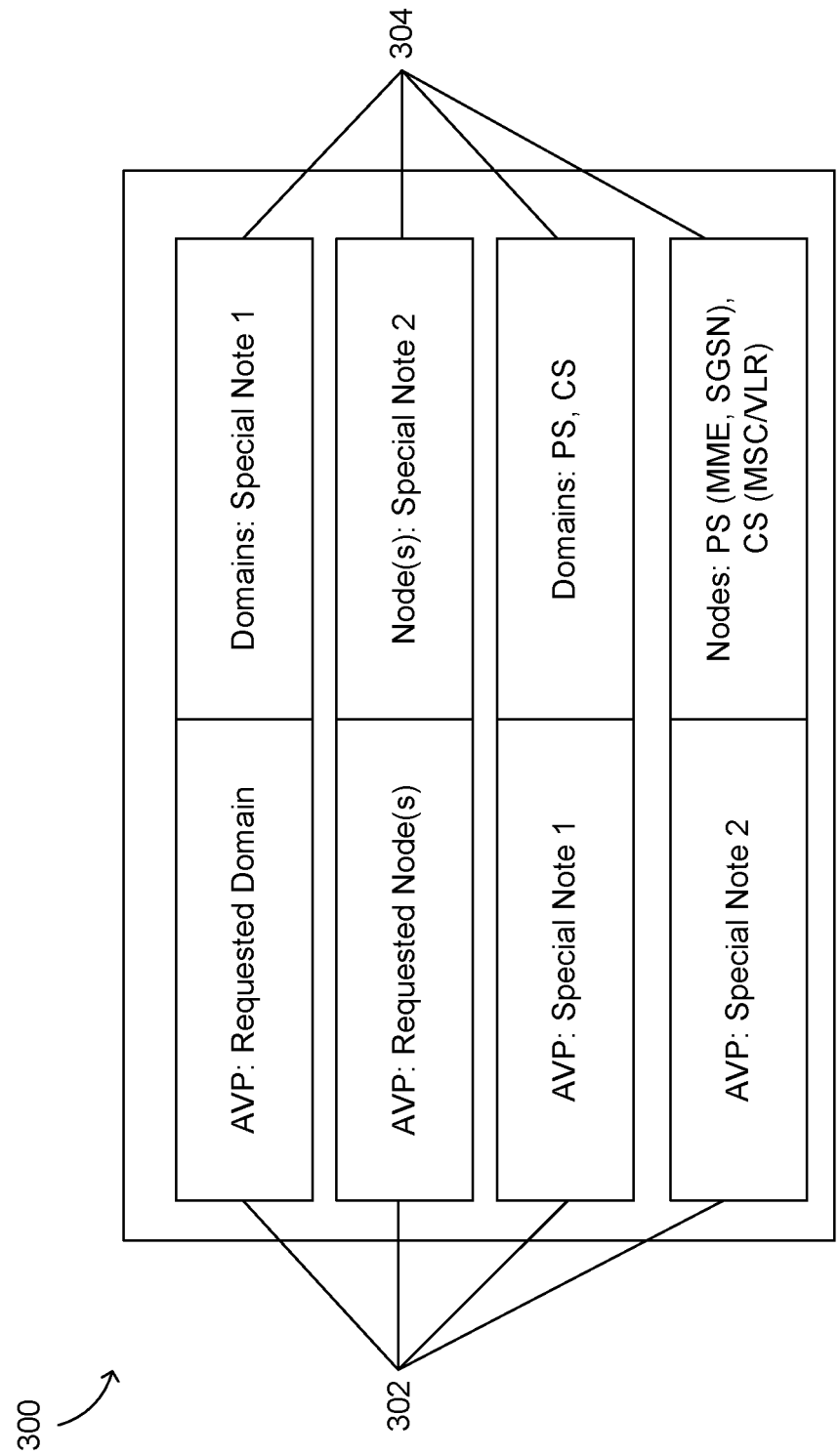
FIG. 3 illustrates a user data request including a query hierarchy.

FIG. 3 shows a user data request (UDR) 300. The UDR 300 includes attribute value pairs (AVPs) to structure a query hierarchy, thereby setting the order in which to query the domains and the order in which to query the node or nodes of each respective domain. Each AVP includes an attribute 302 and a value 304. The value 304 is data or information. The attribute 302 is the field represented by the value 304. The UDR 300 includes a domain attribute and a node attribute. The domain values can include "1" (for PS domain), "0" (for CS domain), or the values can be imported from a list of another attribute. The node values can include "1" (for SGSN), "0" (for MME), "0,1" or "1,0" (for both SGSN and MME in the respective order) values, a "MSC/VLR" value, or the values can be imported from a list of another attribute.

The UDR 300 can include an AVP having a special attribute. The values associated with the special attribute can be provided in a list. The list associated with the special attribute can be imported by one of the other attributes. This allows for multiple queries to be generated by a single UDR rather than a single query based on a single request.

The UDR 300 can also include multiple AVPs with each AVP having a special attribute. Values of each of the special attributes can be provided in a list. The lists associated with each of the special attributes can be imported by the other attributes. This allows for multiples queries to be generated by a single UDR, rather than single query based on a single request.

For example, a UDR includes "requested domain," "requested node," special note 1," and "special note 2" attributes. The "special note 1" includes a domain query hierarchy (i.e., order in which to query domains). The "special note 2" includes a node query hierarchy (i.e., order in which to query nodes of the respective domains). The "requested domain" imports the list associated with "special note 1" and the "requested node" imports the list associated with "special note 2."

As another example, a UDR includes "requested domain," "requested node," special note 1," and "special note 2" attributes. The "special note 1" includes a list to query the PS domain first and the CS domain second (e.g., "1,0"). The "special note 2" includes a list to query the MME first and the SGSN second when querying the PS domain, then the MSC/VLR when querying the CS domain (e.g., "0,1," MSC/VLR"). The "requested domain" imports the list associated with "special note 1" and the "requested node" imports the list associated with "special note 2." Therefore, the UDR causes the MME to be queried first (PS domain), then the SGSN second (PS domain), and then the MSC/VLR third (CS domain).

Though two special notes are discussed, the domain and node hierarchies can be provided in a single special note. Furthermore, though the lists are discussed as being imported by other attributes, the lists of one attribute can be read or recalled by another attribute. Additionally, in one example, only the MSC/VLR node is queried for the CS domain, such that a value for the requested node associated with the CS domain is not required.

Returning to FIG. 2, at 204, the application server queries the node of the first domain based on the domain and node hierarchies. At 206, the node of the first domain generates and transmits a response to the application server indicating whether or not the UE is registered to the first domain. In one example, multiples nodes of the first domain can be queried, such as when a first node does not recognize UE registration.

At 208, when the UE is registered to the first domain, the node generates a notification that the UE is registered with the first domain (i.e., "positive," "UE is registered to first domain," or the like). Since the UE is registered to the first domain, the second domain is not queried. At 210, services available via the first domain can then be used or made available to the UE, such as via the application server.

At 212, when the UE is not registered to the first domain, the node generates a notification that the UE is not registered with the first domain (i.e., "negative," "UE is not registered to the first domain," or the like). The node retains the UDR until a positive response is received from a domain about UE registration. At 214, the node then queries the second domain based on the UDR. At 208, the node generates and transmits a registration notification that the UE is registered with the second domain. The node can be the HSS. At 210, services available via the second domain can then be used or made available to the UE, such as via the application server.

For example, the application server generates a UDR including "requested domain," "requested node," special note 1," and "special note 2" attributes. The "special note 1" includes a domain query hierarchy (i.e., order in which to query domains). The "special note 2" includes a node query hierarchy (i.e., order in which to query nodes of the respective domains). A first domain is a PS domain including a MME and a SGSN. A second domain is a CS domain including a MSC/VLR.

Embodiments of the invention can include a non-transitory computer readable medium which can store instructions for performing the above-described methods and any steps thereof, including any combinations of the same. For example, the non-transitory computer readable medium can store instructions for execution by one or more processors or similar devices.

Further embodiments of the present invention can also include the one or more user equipment(s), network sites, backend network, or servers which read out and execute computer executable instructions, such as a non-transitory computer-readable medium, recorded or stored on a storage medium (which may be the same as or different than the storage medium for storing images or files, as discussed above), to perform the functions of any embodiment. The user equipment or server may include one or more of a central processing unit (CPU), micro processing unit (MPU), or other circuitry, such as a processor, and may include a network of separate user equipment or servers or separate computer processors. The computer executable instructions may be provided to the user equipment, network node, or server, for example, from a network or the storage medium.

Though certain elements, aspects, components or the like are described in relation to one embodiment or example of a telecommunications network, those elements, aspects, components or the like can be including with any other telecommunications network, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. An application server of a telecommunications network, comprising:
   one or more processors;
   a memory storing computer-readable instructions that, when executed by the one or more processors, cause the application server to:
   generate a request to a first node and to determine a domain to which a UE is registered based on the response from the first node,
   the request comprising:
   a query hierarchy including an order in which to query a first domain and a second domain, and
   an instruction to query the first node according to the query hierarchy and, if a negative response is received, to query a second node according to the query hierarchy, the first and second nodes coupled to the first and second domains,
determine a domain of the first and second domains to which the user equipment (UE) is registered based on the response from the first node based on the instruction to query the first node, the second node based on the instruction to query the second node, or both,
the processor further configured to execute the computer-readable instructions to generate the request and to determine the domain to which a UE is registered based on the response from the first node; and
an output generating a notification including the domain with which the UE is registered.

2. The system of claim 1, wherein the query hierarchy is based on an attribute value pair (AVP) including the first domain and the second domain.

3. The system of claim 2, wherein the AVP further comprises a domain list including the first and second domains.

4. The system of claim 2, wherein the first domain is a packet-switched domain and the second domain is a circuit-switched domain.

5. The system of claim 4, wherein the first node is a mobility management entity (MME) or a serving GPRS support node (SGSN).

6. The system of claim 1, further comprising a service node to execute network services based on the domain to which the UE is registered.

7. The system of claim 1, further comprising wherein the instruction is further configured to:
query a third node, and
if a negative response is received, to query the first node, the third and first nodes being coupled a similar domain.

8. The system of claim 7, wherein the third node is queried before the first node based on an AVP including the first and third nodes.

9. The system of claim 7, wherein the first and third nodes are associated with a packet-switched domain and the second node is associated with a circuit-switched domain.

10. The system of claim 1, wherein the processor is further configured to receive the response from the first node based on the instruction to query the first node, the second node based on the instruction to query the second node, or both.

11. A method for improving a user data request, comprising:
generating, in response to an instruction received from a processor, a request comprising:
a query hierarchy including an order in which to query a first domain and a second domain, and
an instruction to query a first node according to the query hierarchy and, if a negative response is received, to query a second node according to the query hierarchy, the first and second nodes coupled to the first and second domains;
determining a domain of the first and second domains to which a user equipment (UE) is registered based on a response from the first node based on the instruction to query the first node, the second node based on the instruction to query the second node, or both; and
generating a notification including the domain with which the UE is registered.

12. The method of claim 11, further comprising executing network services based on the domain to which the UE is registered.

13. The method of claim 12, further comprising a service node to execute network services based on the domain to which the UE is registered.

14. The method of claim 11, wherein the query hierarchy is based on an attribute value pair (AVP) including the first domain and the second domain.

15. The method of claim 14, wherein the AVP further comprises a domain list including the first and second domains.

16. The method of claim 14, wherein the first domain is a packet-switched domain and the second domain is a circuit-switched domain.

17. The method of claim 11,
wherein the instruction in the request includes an instruction to query a third node according to the query hierarchy, and
if a negative response is received, querying the first node, the third and first nodes being associated with the same domain.

18. The method of claim 17, wherein the third node is queried before the first node based on an AVP including the first and third nodes.

19. The method of claim 17, wherein the first and third nodes are associated with a packet-switched domain and the second node is associated with a circuit-switched domain.

20. The method of claim 11, further comprising receiving the response from the first node based on the instruction to query the first node, the second node based on the instruction to query the second node, or both.

* * * * *